(12) United States Patent
Dasgupta et al.

(10) Patent No.: US 11,988,649 B2
(45) Date of Patent: May 21, 2024

(54) ON-LINE SUPPRESSOR

(71) Applicant: BOARD OF REGENTS, THE UNIVERSITY OF TEXAS SYSTEM, Austin, TX (US)

(72) Inventors: Purnendu K. Dasgupta, Arlington, TX (US); Bikash Chouhan, Arlington, TX (US); Joseph Ray, Midlothian, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 410 days.

(21) Appl. No.: 17/063,873

(22) Filed: Oct. 6, 2020

(65) Prior Publication Data
US 2022/0107292 A1    Apr. 7, 2022

(51) Int. Cl.
*G01N 30/38* (2006.01)
*B01D 15/36* (2006.01)
*G01N 30/84* (2006.01)

(52) U.S. Cl.
CPC .......... *G01N 30/38* (2013.01); *B01D 15/361* (2013.01); *G01N 2030/8458* (2013.01)

(58) Field of Classification Search
CPC .......... G01N 2030/8458; G01N 30/38; G01N 30/96; G01N 2030/965; G01N 27/4473; B01D 15/361; H01T 21/02
See application file for complete search history.

(56) References Cited

U.S. PATENT DOCUMENTS

| | | | |
|---|---|---|---|
| 4,376,047 A | 3/1983 | Pohl | |
| 5,358,612 A * | 10/1994 | Dasgupta | G01N 27/4473 |
| | | | 204/604 |
| 6,325,976 B1 | 12/2001 | Small et al. | |
| 9,931,585 B2 | 4/2018 | Srinivasan | |
| 10,118,171 B2 | 11/2018 | Woodruff et al. | |
| 11,485,750 B1 * | 11/2022 | Mainolfi | C07D 487/04 |

(Continued)

FOREIGN PATENT DOCUMENTS

| | | | | |
|---|---|---|---|---|
| EP | 0346037 A1 * | 6/1989 | | |
| JP | 6417525 B2 * | 11/2018 | .......... | C03C 17/006 |
| WO | WO-2005000378 A2 * | 1/2005 | .......... | A61M 39/10 |

OTHER PUBLICATIONS

EP Communication dated Mar. 4, 2022 for Application 21199808.3, 8 pages.

(Continued)

*Primary Examiner* — Harshad R Patel
*Assistant Examiner* — Gedeon M Kidanu
(74) *Attorney, Agent, or Firm* — Frost Brown Todd LLP

(57) ABSTRACT

A device for ion chromatography comprises a tube with an inlet opening and an outlet opening and an inner diameter from about 40 microns to about 10 microns. There is an aperture through one side of the tube into a lumen of the tube. At least a portion of the inner surface of the tube has a first charge. An ion exchange barrier covers the aperture on an outside surface of the tube. The inner surface of the tube, from the inlet opening to the aperture, is coated with ion exchange particles having a diameter ranging from about 30 nm to about 200 nm. The ion exchange particles have a second charge opposite the first charge. The inner surface of the tube, from the outlet opening to the aperture, is not coated with ion exchange particles.

12 Claims, 4 Drawing Sheets

(56) References Cited

U.S. PATENT DOCUMENTS

2009/0127200 A1     12/2009   Dasgupta et al.
2018/0093262 A1      4/2018   Dasgupta et al.

OTHER PUBLICATIONS

An Open Tubular Ion Chromatograph, B.C. Yang et a;, Anal. Chem. 2014, 86, 11, 554-11, 561 doi: 10.1021/ac503249t, 7 pages.
Moldable Strong Cation Exchange Polymer and Microchannel, Fereshtech Maleki and Purnendu K. Dasgupta, Analytical Chemistry, 2020, 92, doi:10.1021/acs.analchem.0c02754, 5 pages.

\* cited by examiner

ON-LINE SUPPRESSOR

GOVERNMENT LICENSE RIGHTS

This invention was made with government support under NASA 80NSSC19K0805 awarded by The National Aeronautics and Space Administration (NASA). The government has certain rights in the invention.

BACKGROUND

Suppressor devices are cornerstones of Suppressed Conductometric Ion Chromatography (SCIC) systems, which are often used for the separation and determination of inorganic and many small organic ions. Since electrical conductivity is a universal property of ions, conductance measurement is the most commonly used detection technique in ion chromatography (IC) systems. An ionic eluent is typically at a 1-100 millimolar concentration for eluting analyte ions from a separation column. For IC, the eluent concentration tends to be much higher than the analyte concentration of a sample, which is typically present at micromolar (μM) concentrations (~3 orders of magnitude less than the eluent concentration). Because the equivalent conductance of the eluent ($\lambda_E-$) and the analyte ions ($\lambda_A-$) differ, it is possible to conductometrically detect eluting ions directly after the separation column (Non-Suppressed Ion Chromatography (NSIC)), but the sensitivity is poor as the difference in conductivity $|(\lambda_A-\lambda_E-)|$ is small and the background conductivity is high. A suppressor serves to convert the eluent to a very weak electrolyte (weak acid/base or water), greatly reducing (suppressing) the background conductivity caused by the eluent. Analyte signals are also enhanced because their counterions are substituted by more conductive hydronium or hydroxide ions. By reducing the background conductivity (and hence noise level) by ~3-5 orders of magnitude and improving the analyte sensitivity by nearly an order of magnitude, the limits of detection (LODs) of SCIC systems can be improved by 2 to 3 orders of magnitude relative to NSIC.

A variety of suppressors have been developed for such systems, from early packed-column, hollow-fiber, and micromembrane suppressors, to modern electrodialytic membrane-based and continuously regenerated packed-column suppressors, as well as colloidal ion exchangers. By exploiting the electrolytic decomposition of water to generate the hydronium or hydroxide ions necessary for suppression reactions, an electrodialytic membrane-based suppressor can be operated in self-regenerating mode without the addition of any regenerant, and permits high dynamic suppression capacity with a low dead volume.

Capillary ion chromatography (CIC) is gaining attention because of its relatively low sample volume, low eluent consumption volume, and high efficiency separations. Suppressed Conductometric Capillary Ion Chromatography (SCCIC) was first demonstrated by Rokushika et al., who coupled a resin-packed fused-silica capillary column (0.19 mm i.d.) to a sulfonated hollow fiber tube (0.2 mm i.d.×10 mm) functioning as a suppressor. Strategies previously used to reduce broadening in macroscale suppressors, such as packing perfluorosulfonate cation exchanger (Nafion®) tubing with inert beads, filling with nylon monofilament, etc., are simply inapplicable in CIC-scale systems.

BRIEF SUMMARY

A device for ion chromatography comprises a tube with an inlet opening and an outlet opening and an inner diameter from about 40 microns to about 10 microns. There is an aperture through one side of the tube into a lumen of the tube. At least a portion of the inner surface of the tube has a first charge. An ion exchange barrier covers the aperture on an outside surface of the tube. The inner surface of the tube, from the inlet opening to the aperture, is coated with ion exchange particles having a diameter ranging from about 30 nm to about 200 nm. The ion exchange particles have a second charge opposite the first charge. The inner surface of the tube, from the outlet opening to the aperture, is not coated with ion exchange particles.

A method of analyzing sample ions in a liquid sample comprises the steps of: providing a device as described herein, using an eluent comprising ions to flow a liquid sample comprising sample ions to be detected through the tube, exchanging ions of the eluent using the ion exchange barrier, and detecting the ions of the sample with a detector.

The ion chromatography device is made by providing a tube with an inlet opening and an outlet opening and an inner diameter of from about 40 microns to about 10 microns. The inner surface of the tube is functionalized to provide a charged functionality. An aperture is formed from the outside wall radially into the lumen of the tube. A suspension comprising ion exchange nanoparticles, oppositely charged to that of the inner surface functionality, is flowed into the inlet opening while simultaneously flowing a first fluid into the outlet opening so that both the suspension and the first fluid exit through the aperture. The first fluid does not contain ion exchange nanoparticles. The nanoparticles bind to the oppositely charged inner surface of the tube exposed to the flow of the nanoparticle suspension. The excess unbound nanoparticles are then removed by flowing a second fluid through the inlet while maintaining the flow of the first fluid through the outlet opening so they both exit through the aperture. The aperture is then covered on the outside of the exposed lumen with an ion exchange barrier.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

Figure 1:
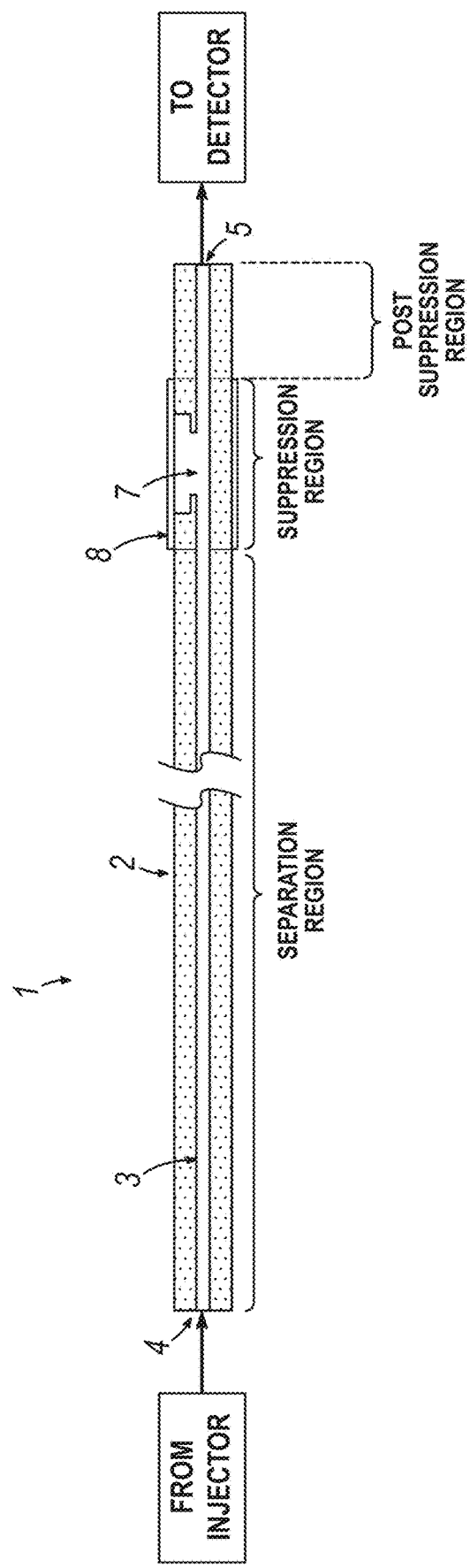
FIG. 1 is a schematic side view of column and suppressor.
Figure 2A:
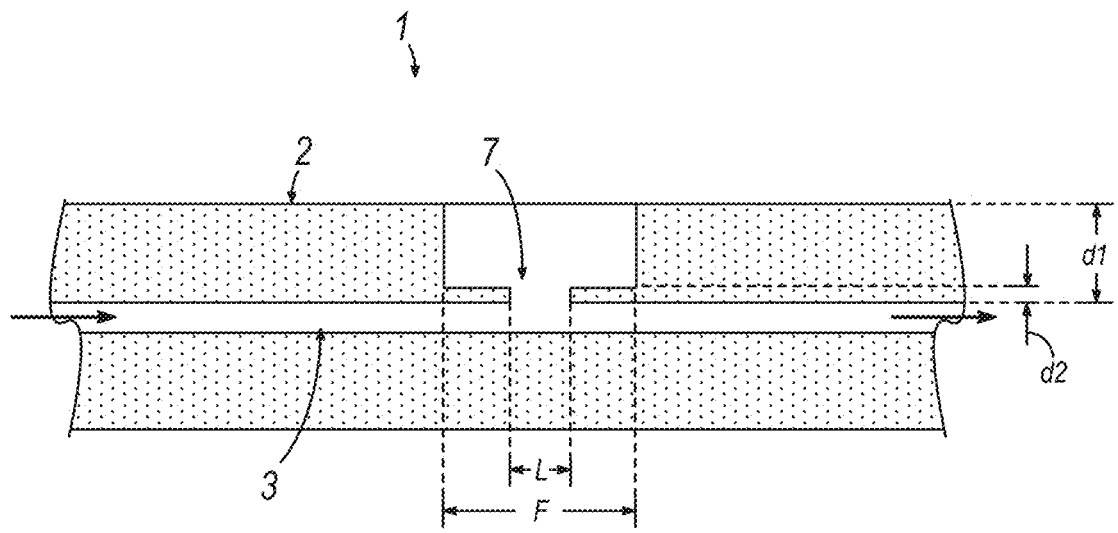
FIG. 2A is a schematic side view of the suppressor region.

A device (1) for ion chromatography comprises a tube (2) having a lumen (3) with an inlet opening (4) and an outlet opening (5) as shown in FIGS. 1 and 2. The lumen having an inner surface and an inner diameter from about 40 microns to about 10 microns. There is an aperture (7) through an outer side of the tube into a lumen of the tube. The aperture is located in between the inlet opening and the outlet opening. In some embodiments, the length of the tube from the inlet opening to the aperture is from about 30 cm to 5 m. At least a portion of the inner surface of the tube has a first charge. A plurality of charged functionalities can be chemically bonded to the inner surface of the tube to form a first charge. An ion exchange barrier (8) covers the aperture on the outside of the tube. The inner surface of the tube, from the inlet opening to the aperture, is coated with ion exchange particles having a diameter ranging from about 30 nm to about 200 nm. The ion exchange particles have a second charge, opposite to the first charge. The inner surface of the tube, from the aperture to the outlet opening, is not coated with ion exchange particles.

The tube comprises both the capillary ion exchange chromatography column (Separation Region) and the suppressor (Suppression Region). The advantages include improved resolution of the chromatogram caused not only by the relatively small inner diameter tubing, but also because the need for a connector in between the column and the suppressor that induces additional dispersion is obviated. The inner diameter of the tube has an effect on the sample size volume that may be used. In some embodiments, the inner diameter of the tube is from about 40 microns to about 10 microns, such as from about 35 microns to about 10 microns, about 35 microns to about 15 microns, and about 35 microns to about 20 microns.

The tube may be made from material which has dimensional stability. The tube may be made of any of broad range of materials from polymers such as polyether(etherketone) to poly(etherimide) to poly(methylmethacrylate) to high density poly(ethylene) or poly(propylene) to a metal such as stainless steel. In some embodiments, the tube comprises polyether(etherketone). In some embodiments, the tube comprises stainless steel. Under certain circumstances, it is desirable to use polymer tubing material that does not leach metal ions that can interfere with ion chromatography analysis.

At least a part of the inner surface (lumen surface) of the tube has a first charge. The charge may be a negative one or a positive one. The charge is used to electrostatically attach oppositely charged ion exchanger nanoparticles. In some embodiments, a negative charge is formed by sulfonation with a sulfonating agent to make a $—SO_3H$ group or by forming a carboxyl group ($—COOH$) by the action of an oxidizing agent. These acidic groups can be readily deprotonated in the presence of positively charged latex particles. In other embodiments, methods are devised to incorporate an amine group on the polymer surface, which can then be converted to a positively charged quaternary ammonium group by treatment with methyl iodide or dimethyl sulfate.

Ion exchange particles are disposed on the inner surface of the tube from the inlet opening to the aperture. The ion exchange particles have a diameter ranging from about 30 nm to about 200 nm. The ion exchange particles have a second charge that is opposite to the first charge, on the wall, and therefore attach to the inner surface by electrostatic attraction. Examples of ion exchange particles include, but are not limited to those described in "Functionalized Polyolefin Capillaries for Open Tubular Ion Chromatography," U.S. Publication No. 2018/0093262, "Ion-Exchange Composition Comprising a Complex of Support Particles, Dispersant, and Electrostatically Bound Layering Particles, U.S. Pat. No. 10,118,171, and "Coated Resin Ion Exchange Composition," U.S. Pat. No. 4,376,047. An example of an ion exchange nanoparticle can be a copolymer that includes vinylbenzylchloride and divinylbenzene where the copolymer is subsequently functionalized with a quaternary ammonium groups. An aminating reagent for forming a quaternary ammonium group can be 1,4-diazabicyclo(2.2.2)octane, trimethylamine, dimethylethanolamine, or methyldiethanolamine.

The aperture in the tube is part of the suppressor. In some embodiments, the length (L) of the aperture, in a dimension parallel to a longitudinal axis of the tube, is from about 0.5 mm to about 5 mm. In some embodiments, the aperture is formed by milling the opening using a multi axis high precision and high accuracy computer numerical control (CNC) milling machine (Atometric Inc., Rockford, Ill.). In some embodiments, the aperture is formed by etching away the tube wall. In some embodiments, the center point of the aperture is located from about 30 mm to about 50 mm from the outlet opening. The aperture can be milled into the tube while a liquid is pumped through the tube, preventing the tube from being clogged with debris.

Figure 3:
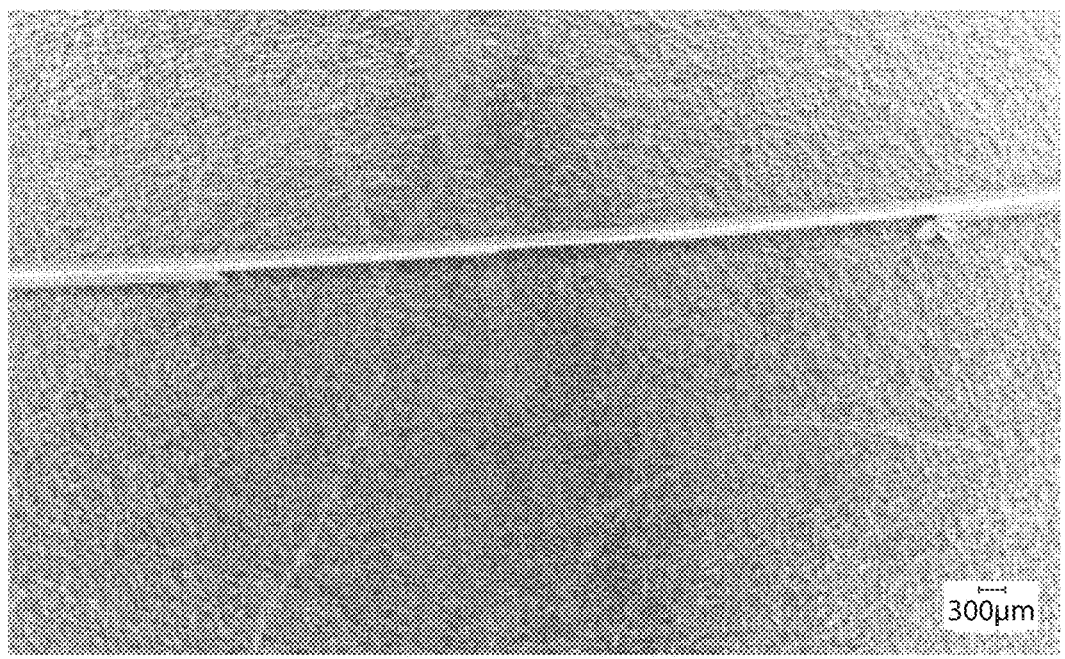
FIG. 3 is a photomicrograph of the machined tube, side view.

In some embodiments, a portion of the thickness of the wall of the tube may be removed to expose of the aperture, this is the cutout region. For example, it may be removed such as with a multi axis high precision and high accuracy CNC machine. In some embodiments, in an area adjacent to the aperture, part of the tube wall material has been removed so that the remaining wall thickness (d2) of the tube in this flat region is from about 20 microns to about 60 microns. In some embodiments, the length of this flat region (F) is from about 1 mm to about 10 mm. FIG. 3 is a photomicrograph of the side view of a machined tube.

In some embodiments, the depth of the aperture (d1), from the outer surface of the tube to the inner surface of the tube, is from about 100 microns to about 10 microns. Examples of the depth of the aperture include, from about 90 microns to about 10 microns, from about 80 microns to about 10 microns, from about 70 microns to about 10 microns, from about 60 microns to about 10 microns, from about 50 microns to about 10 microns, from about 40 microns to about 10 microns, from about 30 microns to about 10 microns, from about 20 microns to about 10 microns, from about 70 microns to about 20 microns, from about 60 microns to about 20 microns, from about 50 microns to about 20 microns, from about 40 microns to about 20 microns, and from about 30 microns to about 20 microns.

The ion exchange barrier is used to exchange the ions of the eluent to remove the eluent counterion and add an acid (e.g., $H^+$) or base (e.g., $OH^-$) to combine with the oppositely charged eluent ion to form water or weakly conducting solution. For example, in anion chromatography, if the eluent is KOH, the ion exchange barrier is a negatively charged sulfonated cation exchanger polymer membrane, which does not permit the transmembrane passage of negatively charged analyte ions but allows the passage of the $K^+$ ion to the outside of the lumen while $H^+$ ion from the outside comes in to replace it, thus converting the eluent ion, $OH^-$ to water. Examples of the cation exchange membrane barrier that are used to convert KOH to water are strongly acid type polymers that include but are not limited to Nafion®, a poly(vinyl alcohol)-styrenesulfonate polymer (see e.g., *Moldable Strong Cation Exchange Polymer and Microchannel*, Fereshteh Maleki and Purnendu K. Dasgupta, Analytical Chemistry, 2020, 92, doi:10.1021/acs.analchem.0c02754). Similarly, in cation exchange chromatography, where a strong acid like $HNO_3$ may be used as the eluent, $H^+$ being the eluent ion, and where the eluent counterion nitrate ($NO_3^-$) is exchanged for $OH^-$ making water, an anion exchange membrane barrier, based on a strongly basic quaternary ammonium functionality polymer, such as one made from poly(vinyl alcohol)-diallyldimethylammonium chloride, may be used.

Figure 2B:
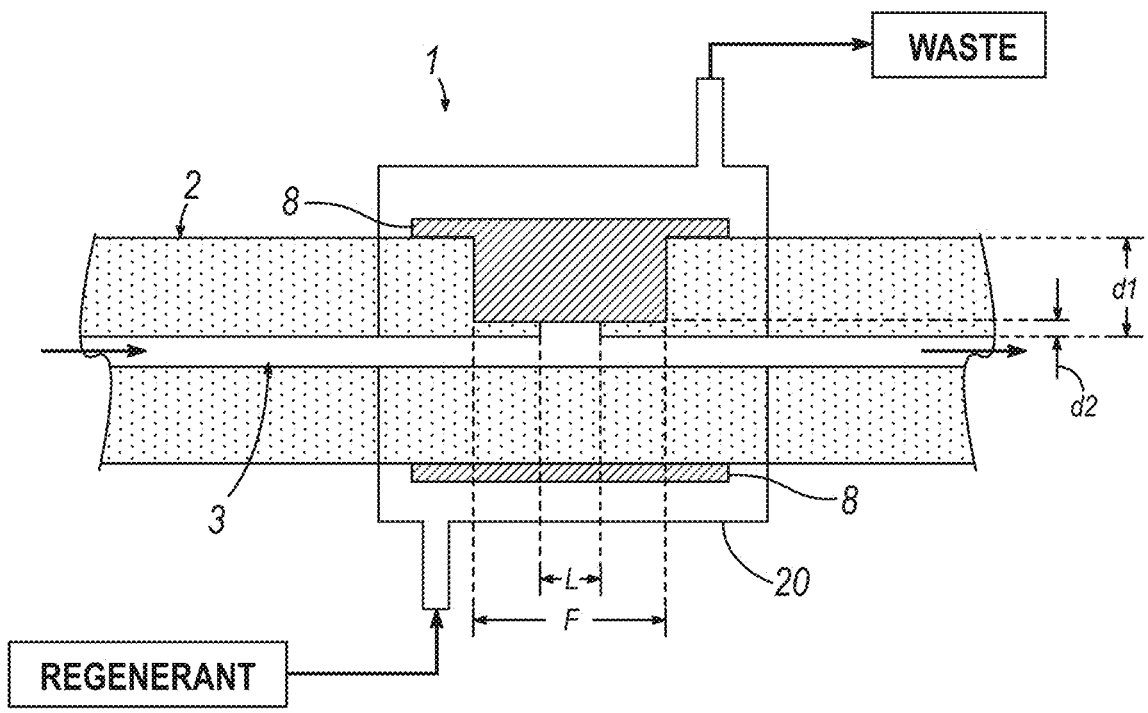
FIG. 2B is a schematic side view of the suppressor region with a jacket enclosing the ion exchange barrier.

In some embodiments, the ion exchange barrier (8) is at least partially enclosed by a jacket (20) comprising an ionic solution (e.g., regenerant solution) that supplies the regenerant ion (e.g., $H^+$ for anion exchange chromatography) to replace the eluent counterion (e.g., $K^+$ for anion exchange chromatography) in the lumen (3), see FIG. 2B. The regenerant solution can be pumped to an inlet of the jacket portion to bathe an outer portion of the ion exchange barrier with regenerant solution. The regenerant solution can then exit through an outlet of the jacket portion. In cation exchange chromatography, the outer solution may contain a supply of $OH^-$ (e.g., as NaOH), which takes the place of the eluent counterion (e.g. $NO_3^-$) in the lumen. The regenerant solution in the outer enclosure allows the ion exchange barrier to be regenerated so the desired ion exchange function of the suppressor can continue to function as a suppressor. In some embodiments, the ionic solution flows by the ion exchange barrier so the barrier is continuously exposed to fresh regenerant solution.

A detector is used to register the elution of the analyte ions in the sample. Examples of a detector include, but are not limited to a conductivity detector and an admittance detector. In some embodiments, a detector is adjacent and fluidically connected to the outlet opening. In some embodiments, the tube connected to the outlet opening is itself conductive and may constitute the detector first electrode. This arrangement allows the detector to register an eluting analyte ion without requiring an additional connection between the tube outlet opening and the detector.

A method of analyzing sample ions in a liquid sample comprise the steps of: providing a device as described herein, using an eluent comprising ions to flow a liquid sample comprising analyte ions to be detected through the tube, exchanging eluent counter ions of the eluent in the lumen with $H^+$ or $OH^-$ ions using the ion exchange barrier, and detecting the analyte ions of the sample with a detector. In some embodiments, the $H^+$ or $OH^-$ ions can combine with the eluent ion to form a neutral, weakly acidic, or weakly basic product. Further, the replacement of the eluent counterion with $H^+$ or $OH^-$ can result in the analyte ion forming a more conductive moiety. In anion analysis for analytes like $Cl^-$ for example, the eluent can be KOH (the eluent ion thus being $OH^-$ and the eluent counterion being $K^+$), replacement of the eluent counterion $K^+$ by $H^+$ results in HCl, which is fully ionized into $H^+$ and $Cl^-$ and is thus highly conductive.

The ion chromatography device is made by providing a tube with an inlet opening and an outlet opening and an inner diameter of from about 40 microns to about 10 microns. The inner surface is functionalized to provide a charged functionality, such as by sulfonate, carboxylate, amine, or quaternary ammonium group. An aperture is formed into the lumen from a side wall of the tube. The aperture is covered on the outside of the exposed lumen with an ion exchange barrier that forms a liquid seal around the periphery of the aperture. The ion exchange barrier prevents bulk liquid flow out of the aperture which allows for liquid flow from the inlet opening to the outlet opening. The ion exchange barrier is configured to pass ions of only one charge, positive or negative (not both), across the ion exchange barrier from one side to the other side. The ion exchange barrier is configured to block ions that of the same charge as the analyte ions.

The ion exchange nanoparticles are only located between the inlet opening and the aperture. They are selectively put there by simultaneously flowing a suspension of ion exchange particles into the inlet opening while flowing a first fluid into the outlet opening so they both exit through the aperture. Examples of the first fluid include water and air. The first fluid flow prevents the suspension of ion exchange particles from contacting the charged functionality on the inner surface between the aperture and the outlet opening. The excess unbound nanoparticles are then washed from the tube by replacing the suspension with a second fluid while continuing to flow a first fluid from the outlet opening so they both exit through the aperture. The aperture is then covered on the outside of the exposed lumen with an ion exchange barrier.

In some embodiments, the aperture (7) is formed by a milling process. The aperture may be formed by milling the opening using a multi axis high precision and high accuracy CNC machine. The milling process may be a two-step process where a cutout region is formed by milling away a portion of the thickness of the wall of the tube, which is illustrated by flat region (F) of FIG. 2A. An example is where a tube with a 360 micron outer diameter and a 25 micron inner diameter is milled to remove about 125 microns in 5 micron steps. This does not expose the lumen of the tube. The depth ($d2$) to the lumen is (360 microns−25 microns)/2=167.5 microns. A dye may be flowed through the tube or pressurized so that when the lumen has been breached, the dye flows out of the tube indicating an aperture has been formed. A stepped structure is formed when a smaller portion of the cutout region is then milled until the lumen has been breached. It is worthwhile to note that the ion exchange barrier can be disposed on an outer surface of tube 2 and also preferably on the outer surface of flat region F, as illustrated in FIG. 2B. The presence of the ion exchange barrier in the flat region F causes the ion exchange barrier to partly form a portion of the inner surface of the tube which helps reduce an increased volume of the lumen. If the aperture was formed in a one step process without forming the flat region, the ion exchange barrier would only be disposed on an outer surface of tube 2 causing the volume of the lumen to increase incrementally (e.g., distance $d1$×area of aperture). In some embodiments, the tube comprises polyether(etherketone).

Figure 5A:
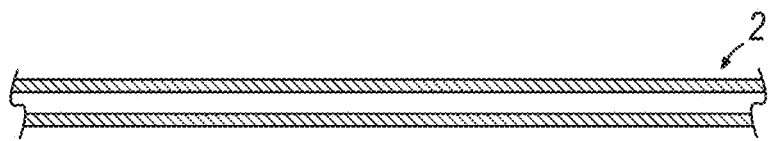
FIGS. 5A, 5B, 5C, 5D, 5E, 5F, 5G, and 5H provide a schematic of the method for making the stainless steel device.
Figure 5B:
Figure 5C:
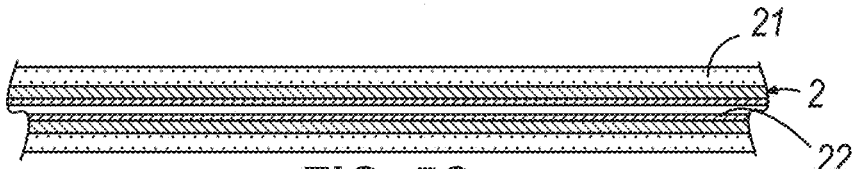
Figure 5D:
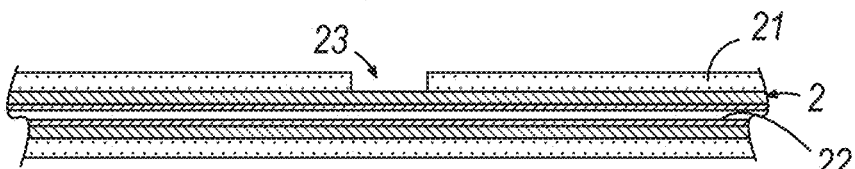
Figure 5E:
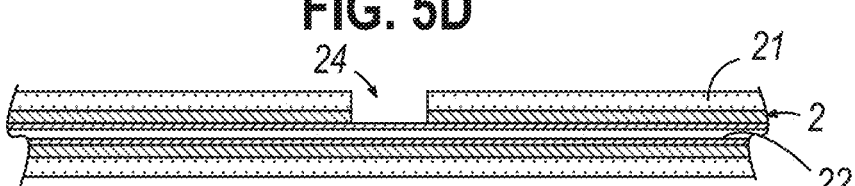
Figure 5F:
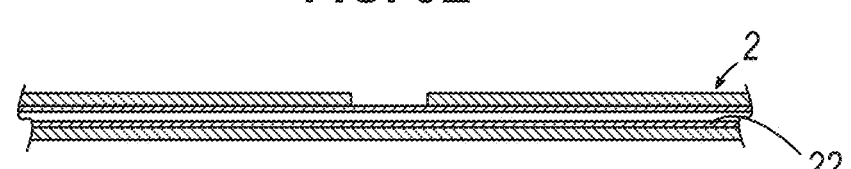
Figure 5G:
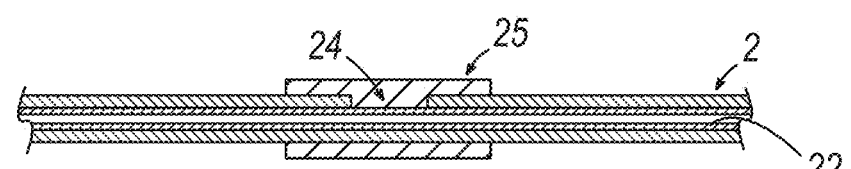
Figure 5H:
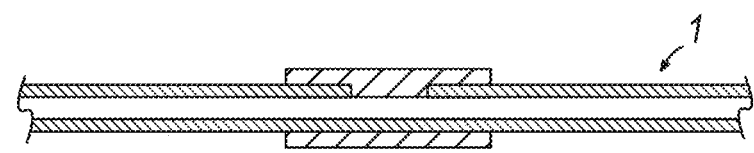

In some embodiments, the aperture is formed by etching away a metallic tube. This process is shown in FIGS. 5A-5H. First, the outside of the tube (2), FIG. 5A, is coated with an etchant-resistant coating (21), FIG. 5B, an example is solvent-diluted nail polish. Optionally, the inside of the tube may be filled with paraffin wax (22), FIG. 5C. A small portion (23) of the etchant-impervious coating (21) is removed, FIG. 5D, by scraping or cutting. An aperture (24) is then etched through the tube (2), FIG. 5E. An example of an etching method is the use of an aqueous solution containing $KNO_3$ (0.1 M) and $FeCl_3$ (10 mM). The tube was attached to a positive electrode and a negative electrode was positioned near the location of the aperture to be formed. A voltage is applied across the electrodes, such as 9 V. After the aperture (24) is formed, the etchant-impervious nail polish coating is removed with a solvent, FIG. 5F. An etchant-impervious coating that is removed by scraping has a larger part of the tube removed compared to one that is removed by cutting. The aperture (24) is covered on the outside of the exposed lumen with an ion exchange barrier (25), FIG. 5G. The optional paraffin wax is removed to form the device (1), FIG. 5H. In some embodiments, the tube comprises stainless steel. The etching process to form the aperture may or may not use electrochemical assistance.

While the present disclosure has illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Sulfonation of Column

The inner surface of the polyether(etherketone) tube was sulfonated by filling it with 80% (w/w) sulfuric acid, sealing both ends with polyolefin-based hot-melt adhesive, and keeping it in the oven at 70° C. for 120 hours. The tube was then cleaned first by purging with nitrogen to remove residual sulfuric acid and then with DI water for 30 minutes.

Milling an Aperture

An aluminum jig was machined to form a surface containing a straight channel of rectangular cross section that was 0.015" wide and 0.01" deep. A PEEK/plastic capillary was laid into the channel and affixed with cyanoacrylate "super glue". The jig was placed face down flat on a piece of polytetrafluoroethylene to keep the capillary in place until the glue dried. The location of the suppressor was made in reference to the edge of the jig; capillary overhang results in a suppressor further from the outlet. The aperture was milled by cutting perpendicular to the length of the capillary. The tool path cleared the capillary before moving longitudinally along the length followed by another sweep. The process was repeated until the desired aperture width was obtained. First a flat was milled into the capillary wall within 0.002" of the capillary lumen center that was 0.3" in length along the capillary. In the center of this flat the active portion of the suppressor was milled 0.002" below the flat at the desired length. Water was pumped through the capillary to prevent debris from blocking the bore. The cutting was performed from exit to inlet using a 0.02" diameter square end mill. The tool speed was 40,000 rpm with a feed rate of 5080 mm/min. A flood of non-oil based water soluble coolant was used under ambient conditions. Proper depth was established using a small step down of 5 micron between cuts starting at the near side surface and watching for liquid flow at the capillary outlet. Subsequent apertures were created in capillaries with 0.001" step downs between each pass of the toolhead. After milling was complete, the capillary was removed by soaking the jig in acetone. The capillary was further rinsed in acetone and water to provide a machined tube as illustrated in FIG. 3. Liquid was pumped from both directions to verify the capillary was not blocked.

Creating the Ion Exchange Coating

The sulfonated tube was coated with IonPac AS18 or AS16 or AS11 anion exchange latex nanoparticles by pumping the suspension pneumatically into the tube for 40 minutes. A 1% (w/v) latex suspension was diluted 10 times with DI water before pumping into the tube. The suspension was pumped at 100-300 nL/min to the inlet opening of the tube. Deionized water was pumped at a similar flow rate from the outlet opening of the tube, which was the end proximal to the aperture. It will be appreciated that the necessary pressures are in the same ratio of the distance of the far end from the aperture to that from the near end to the aperture. The process is carried out at room temperature for a period of 30 minutes to several hours depending on the length of the column but at least until 20 column volumes of the suspension were passed through the column. The suspension flow from the distal end (inlet opening 4) was then replaced by deionized water flow, which was continued for at least 30 min after the aperture effluent was completely clear (no opalescence, characteristic of the presence of suspended latex particles). The DI water stream from the distal end was then replaced by 10 mM potassium hydroxide to convert the latex to the hydroxide form; this flow is continued from 30 minutes to several hours depending on the length of the column.

Analyzing a Sample

Figure 4:
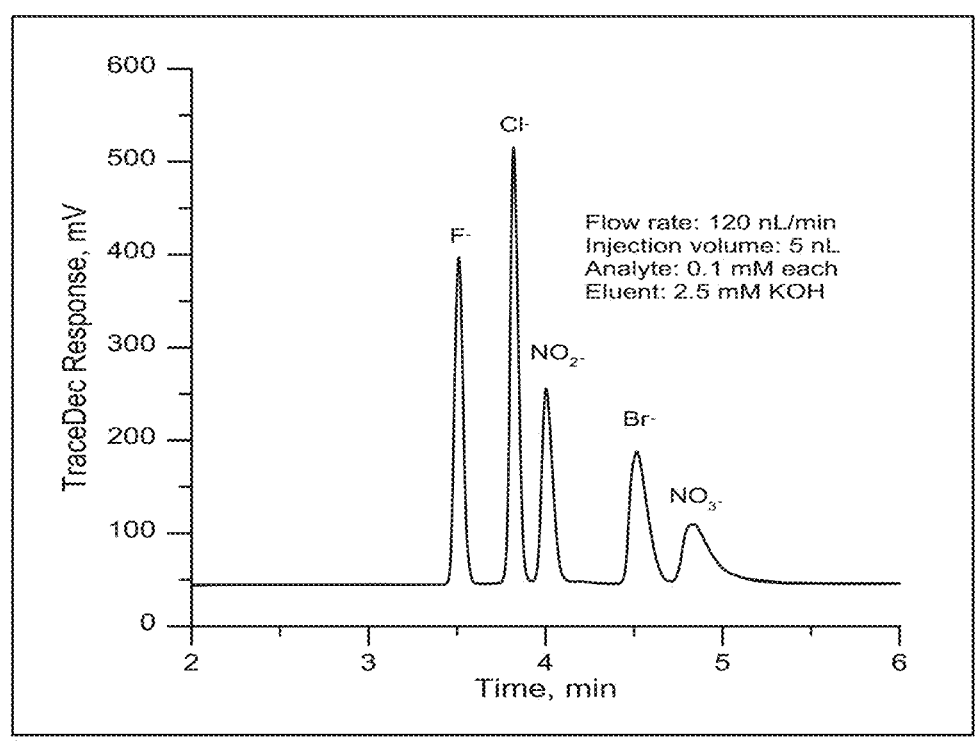
FIG. 4 is a chromatogram (admittance detector).

The experimental arrangement is similar to that described in FIG. 1 of "An Open Tubular Ion Chromatograph", B. C. Yang, M. Zhang, T. Kanyanee, B. Stamos, and P. K. Dasgupta, *Anal. Chem.* 2014, 86, 11,554-11,561 doi: 10.1021/ac503249t). All operations were conducted at room temperature (22° C.). The eluent (2.5 mM KOH) was pumped pneumatically under the control of a digital pressure controller at a flow rate of 120 nL/min. Hydrodynamic injection was used to inject 5 nL of a sample containing 100 µM each of $F^-$, $Cl^-$, $NO_2^-$, $Br^-$, and $NO_3^-$. The detector was a TraceDec (Innovative Sensor Technologies, Strasshof, Austria) placed immediately on a tube connected to the suppressor outlet. A regenerant solution of 2 mM $H_2SO_4$ was flowed at a flow rate of 0.1 mL/min through the jacketed portion of the column/suppressor module. FIG. 4 shows a chromatogram for separating this sample indicating the ability to show high resolution separation and a low suppressed background while separating a nanoliter sample volume at a low flow rate chromatogram.

What is claimed is:

1. A device for ion chromatography comprising:
a tube with an inlet opening and an outlet opening and an inner diameter from about 40 microns to about 10 microns, wherein there is an aperture through one side of the tube into a lumen of the tube, wherein at least a portion of the lumen surface of the tube has a first charge,
wherein there is an ion exchange barrier covering the aperture on the outside surface of the tube,
wherein the inner surface of the tube, from the inlet opening to the aperture, is coated with ion exchange particles having a diameter ranging from about 30 nm to about 200 nm, wherein the ion exchange particles have a second charge opposite the first charge,
wherein the inner surface of the tube, from the outlet opening to the aperture, is not coated with ion exchange particles.

2. The device of claim 1, wherein the inner diameter is between about 15 microns to about 30 microns.

3. The device of claim 1, wherein the tube comprises polyether (etherketone).

4. The device of claim 1, wherein the tube comprises stainless steel.

5. The device of claim 1, wherein the ion exchange barrier is a polymer bearing strong acid or strong base.

6. The device of claim 1, wherein the ion exchange barrier is at least partially enclosed by a jacket comprising an ionic solution.

7. The device of claim 1, wherein the length of the aperture, in a dimension parallel to a longitudinal axis of the tube, is from about 0.5 mm to about 5 mm.

8. The device of claim 1, wherein an area adjacent to the aperture, part of the tube has been removed so that the thickness of the tube from the surface to the lumen is from about 20 microns to about 60 microns.

9. The device of claim 8, where the length in the dimension parallel to a longitudinal axis of the tube of the removed portion is from about 1 mm to about 10 mm.

10. A chromatography system comprising the device of claim 1 and further comprising a detector, wherein the detector is fluidly connected to the outlet opening.

11. A method of analysis of sample ions in a liquid sample comprising:
   a) providing a tube comprising an inlet opening and an outlet opening and an inner diameter, wherein there is an aperture through one side of the tube into a lumen of the tube, wherein at least a portion of the inner surface of the tube has a first charge
   wherein there is an ion exchange barrier covering the aperture on the outside of the tube,
   wherein the inner surface of the tube, from the inlet opening to the aperture, is coated with ion exchange particles, wherein the ion exchange particles have a second charge opposite the first charge,
   wherein the inner surface of the tube, from the outlet opening to the aperture, is not coated with ion exchange particles
   b) using an eluent comprising ions to flow a liquid sample comprising sample ions to be detected through the tube,
   c) exchanging eluent counterions of the eluent using the ion exchange barrier to remove eluent counterions from the lumen,
   d) detecting the ions of the liquid sample with a detector.

12. The method of claim 11, wherein the detector measures the conductivity of the solution flowing through it.

* * * * *